US009334739B2

(12) United States Patent
Kepler et al.

(10) Patent No.: US 9,334,739 B2
(45) Date of Patent: May 10, 2016

(54) GAS TURBINE ENGINE ROTOR ASSEMBLY OPTIMIZATION

(71) Applicant: SOLAR TURBINES INCORPORATED, San Diego, CA (US)

(72) Inventors: Jason David Kepler, San Diego, CA (US); Genaro Rodriguez, Duncanville, TX (US)

(73) Assignee: Solar Turbines Incorporated, San Diego, CA (US)

(*) Notice: Subject to any disclaimer, the term of this patent is extended or adjusted under 35 U.S.C. 154(b) by 358 days.

(21) Appl. No.: 13/962,758

(22) Filed: Aug. 8, 2013

(65) Prior Publication Data

US 2015/0046126 A1 Feb. 12, 2015

(51) Int. Cl.

| | |
|---|---|
| ***G06F 19/00*** | (2011.01) |
| ***B21K 25/00*** | (2006.01) |
| ***B23P 15/04*** | (2006.01) |
| ***G01C 9/00*** | (2006.01) |
| ***G01C 17/00*** | (2006.01) |
| ***G01C 19/00*** | (2013.01) |
| ***G01M 1/38*** | (2006.01) |
| ***G05B 19/18*** | (2006.01) |
| ***G05B 13/00*** | (2006.01) |
| ***G05B 15/00*** | (2006.01) |
| ***G05D 23/00*** | (2006.01) |
| ***F01D 5/06*** | (2006.01) |
| *F01D 5/02* | (2006.01) |

(52) U.S. Cl.

CPC . *F01D 5/06* (2013.01); *F01D 5/027* (2013.01); *F05D 2230/61* (2013.01)

(58) Field of Classification Search

CPC ........ F01D 5/06; F01D 5/027; F05D 2230/61

USPC ............ 700/95, 117, 250, 279, 303; 702/150, 702/151; 29/889.2, 889.21, 889.22

See application file for complete search history.

(56) References Cited

U.S. PATENT DOCUMENTS

| | | | | |
|---|---|---|---|---|
| 6,341,419 | B1 | 1/2002 | Forrester et al. | |
| 6,898,547 | B1 | 5/2005 | DeBlois et al. | |
| 7,555,939 | B2 | 7/2009 | Lucas et al. | |
| 7,739,072 | B2 * | 6/2010 | DeBlois | F01D 21/003 702/127 |
| 7,792,600 | B2 | 9/2010 | Borneman et al. | |
| 7,877,223 | B2 | 1/2011 | Lee et al. | |
| 7,912,587 | B2 | 3/2011 | Walters et al. | |
| 7,974,811 | B2 | 7/2011 | Lee | |
| 7,979,233 | B2 * | 7/2011 | DeBlois | F01D 21/003 702/127 |
| 8,561,299 | B2 * | 10/2013 | Walters | B21D 53/84 29/889.21 |
| 2006/0010686 | A1 * | 1/2006 | Henning | F04D 15/0088 29/889 |
| 2009/0165273 | A1 * | 7/2009 | Calvert | F01D 5/027 29/281.5 |
| 2009/0171491 | A1 * | 7/2009 | Borneman | F01D 5/027 700/98 |
| 2009/0234481 | A1 * | 9/2009 | Lee | F01D 5/027 700/98 |
| 2009/0320286 | A1 | 12/2009 | Walters | |
| 2013/0247378 | A1 * | 9/2013 | Walters | B21D 53/84 29/889.2 |

* cited by examiner

*Primary Examiner* — Ronald Hartman, Jr.

(74) *Attorney, Agent, or Firm* — Procopio, Cory, Hargreaves & Savitch LLP

(57) ABSTRACT

A method for optimizing a rotor assembly for a gas turbine engine is disclosed. The rotor assembly includes rotating parts including a first journal and one or more rotor disks. The method includes determining vector components for a total parallelism vector for each rotating part, determining a total parallelism sum including determining a magnitude of each total parallelism vector and adding the magnitudes into a single sum, and determining a minimum value for the total parallelism sum including selecting the rotor disk build angles and the second journal build angle that result in the smallest value for the total parallelism sum.

20 Claims, 6 Drawing Sheets

GAS TURBINE ENGINE ROTOR ASSEMBLY OPTIMIZATION

TECHNICAL FIELD

The present disclosure generally pertains to gas turbine engines, and is more particularly directed toward optimizing the assembly of rotors for gas turbine engines.

BACKGROUND

Gas turbine engines include compressor, combustor, and turbine sections. The compressor and turbine sections include rotor assemblies with rotor disks assembled together. Due to limitations in manufacturing, the centers of the rotor disks may not align concentrically and the surfaces of the rotor disks that contact other disks may not be parallel. Systems and methods may be used to align and balance the rotor assemblies.

U.S. Pat. No. 6,341,419 to J. Forrester discloses one such method where a plurality of rotors are individually measured for determining relative eccentricity between forward and aft annular mounting ends thereof. The measured rotor eccentricities are stacked analytically to minimize eccentricity from a centerline axis. The rotors are then assembled axially end to end to correspond with the stacked measured eccentricities thereof.

The present disclosure is directed toward overcoming one or more of the problems discovered by the inventors or that is known in the art.

SUMMARY OF THE DISCLOSURE

A method for optimizing a rotor assembly for a gas turbine engine is disclosed. In one embodiment of the disclosed method, the rotor assembly includes rotating parts including a first journal and one or more rotor disks being stacked sequentially onto the first journal. The method includes determining vector components for a total parallelism vector for each rotating part. The total parallelism vector includes a parallelism magnitude and angle for a rotor stack of rotating parts up to and including the rotating part. The method also includes determining a total parallelism sum. Determining a total parallelism sum includes determining the parallelism magnitude of each total parallelism vector and adding the parallelism magnitudes into a single sum. The method further includes determining a minimum value for the total parallelism sum. Determining a minimum value for the total parallelism sum includes selecting the rotating disk build angles and the second journal build angle that result in the smallest value for the total parallelism sum.

In another embodiment of the disclosed method, the rotor assembly includes rotating parts including a first journal, one or more rotor disks being stacked sequentially onto the first journal, and a second journal being stacked onto a final rotor disk of the one or more rotor disks. The method includes determining vector components for a total concentricity vector for each rotating part. The total concentricity vector includes a concentricity magnitude and angle for a rotor stack of rotating parts up to and including the rotating part. The method also includes determining a true concentricity for each vector component relative to a center of rotation for the rotor assembly determined by positions of the first journal and the second. The method further includes determining a total concentricity sum. Determining a total concentricity sum includes determining a magnitude of each true concentricity vector and adding the magnitudes into a single sum.

The method also includes determining a minimum value for the total concentricity sum. Determining a minimum value for the total concentricity sum includes selecting the rotor disk build angles and the second journal build angle that result in the smallest value for the total concentricity sum.

DETAILED DESCRIPTION

The systems and methods disclosed herein include a gas turbine engine including rotor assemblies such as a compressor rotor assembly and a turbine rotor assembly and a stacking system. In embodiments, the build angles for the rotating parts of the rotor assemblies may be determined by optimizing the total parallelism of the rotor assembly taken as a whole, the total concentricity of the rotor assembly taken as a whole relative to a datum axis through the first and second journal of the rotor assembly, or the combined total parallelism and total concentricity of the rotor assembly taken as a whole. Optimizing the total parallelism, the total concentricity, or both may improve the alignment of the rotating parts and the build quality of the rotor assembly, and may reduce the time needed to build or stack a rotor assembly.

Figure 1:
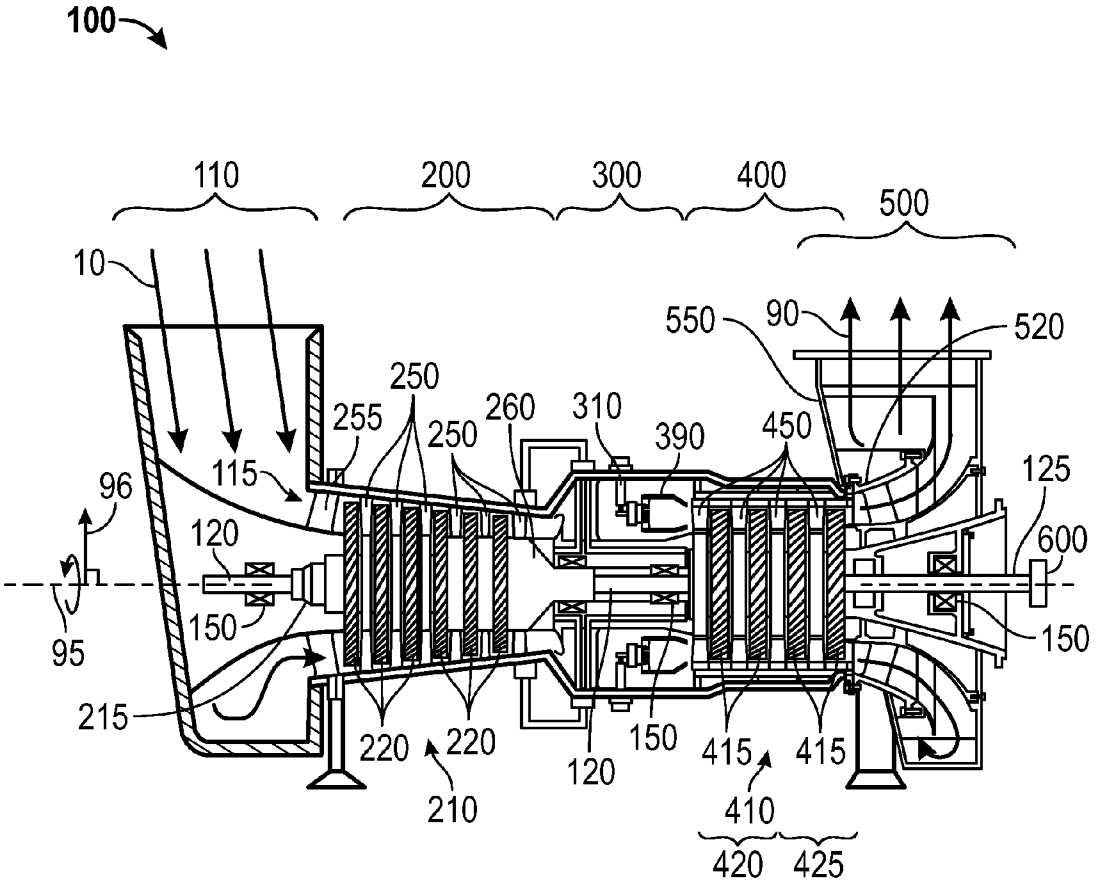
FIG. 1 is a schematic illustration of an exemplary gas turbine engine.

FIG. 1 is a schematic illustration of an exemplary gas turbine engine. Some of the surfaces have been left out or exaggerated (here and in other figures) for clarity and ease of explanation. Also, the disclosure may reference a forward and an aft direction. Generally, all references to “forward” and “aft” are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft or shafts (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 includes an inlet 110, a compressor 200, a combustor 300, a turbine 400, an exhaust 500, and a power output coupling 600.

The compressor 200 includes a compressor rotor assembly 210, compressor stationary vanes (stators) 250, and inlet guide vanes 255. As illustrated, the compressor rotor assembly 210 is an axial flow rotor assembly. The compressor rotor assembly 210 includes a one or more compressor disk assemblies 220. Each compressor disk assembly 220 includes a compressor rotor disk (shown in FIG. 2) that is circumferentially populated with compressor rotor blades 235 (shown in FIG. 2). Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the compressor stages.

Compressor rotor assembly 210 may also include a compressor cone 215 and a compressor hub 260. Compressor cone 215 may be at one axial end of compressor rotor assembly 210 and compressor hub 260 may be at the other axial end of compressor rotor assembly 210, opposite compressor cone 215, with the compressor disk assemblies 220 there between.

The combustor 300 includes one or more fuel injectors 310 and includes one or more combustion chambers 390. The fuel injectors 310 may be annularly arranged about center axis 95.

The turbine 400 includes a turbine rotor assembly 410, and turbine nozzles 450. As illustrated, the turbine rotor assembly 410 is an axial flow rotor assembly. The turbine rotor assembly 410 may include one or more turbine disk assemblies 415. Turbine disk assemblies 415 each include a turbine disk that is circumferentially populated with turbine blades.

A turbine nozzle 450 axially precedes each of the turbine disk assemblies 415. Each turbine disk assembly 415 paired with the adjacent turbine nozzle 450 that precedes the turbine disk assembly is considered a turbine stage. Turbine 400 includes multiple turbine stages.

Turbine 400 may also include a gas producer section 420 and a power turbine section 425. Gas producer section 420 and power turbine section 425 may each include one or more turbine stages.

Gas turbine engine 100 may include a single or dual shaft configuration. In the embodiment illustrated, gas turbine engine 100 includes a gas producer shaft 120 and a power turbine shaft 125. The gas producer shaft 120 mechanically couples to compressor rotor assembly 210 and to turbine disk assemblies 415 in gas producer section 420. The Power turbine shaft 125 couples to turbine disk assemblies 415 in power turbine section 425. Power turbine shaft 125 may also include power output coupling 600.

The exhaust 500 includes an exhaust diffuser 520 and an exhaust collector 550.

Figure 2:
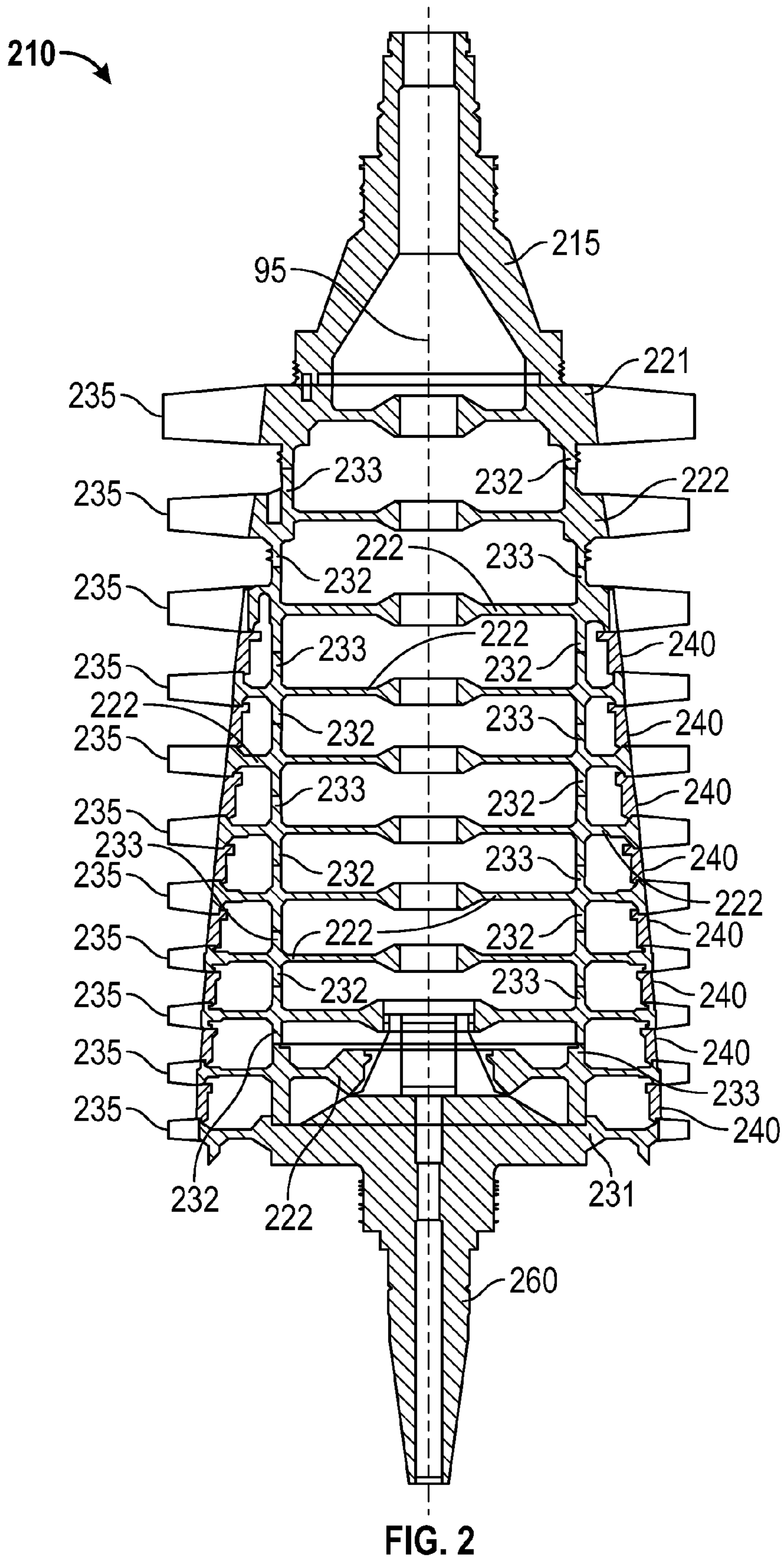
FIG. 2 is a cross-sectional view of the compressor rotor assembly of FIG. 1.

FIG. 2 is a cross-sectional view of the compressor rotor assembly 210 of FIG. 1. In the embodiment illustrated in FIG. 2, compressor rotor assembly 210 includes a forward compressor disk 221, an aft compressor disk 231, and one or more intermediate compressor disks 222. Forward compressor disk 221, intermediate compressor disks 222, and aft compressor disk 231 are each part of a compressor disk assembly 220 including compressor rotor blades 235.

Forward compressor disk 221 is the axially forward compressor disk 221 and aft compressor disk 231 is the axially aft compressor disk 231. Forward compressor disk 221 is in axial contact with the intermediate compressor disk 222 aft and adjacent forward compressor disk 221. Aft compressor disk 231 is in axial contact with the intermediate compressor disk 222 forward and adjacent aft compressor disk 231. Each intermediate compressor disk 222 is in axial contact with either forward compressor disk 221 or the forward and adjacent intermediate compressor disk 222, and is in axial contact with either aft compressor disk 231 or the aft and adjacent intermediate compressor disk 222.

The contact surfaces between adjacent compressor disks may be radially extending and axially facing surfaces. Forward compressor disk 221 may include an aft contact portion 232 that includes a contact surface. In the embodiment illustrated, aft contact portion 232 is a hollow cylinder or annular feature extending aft in the direction of aft compressor disk 231. Each intermediate compressor disk 222 may include a forward contact portion 233 and an aft contact portion 232. The forward contact portion 233 is a hollow cylinder or annular feature extending forward in the direction of forward compressor disk 221. In the embodiment illustrated, aft compressor disk 231 does not include an aft contact portion 232, but may include an aft contact portion 232 in other embodiments.

Adjacent compressor disks may be coupled together. In one embodiment, each forward contact portion 233 and each aft contact portion 232 include anti-rotation and alignment features such as coupling teeth. The teeth on forward contact portion 233 fit between the teeth on aft contact portion 232. In another embodiment, each forward contact portion 233 is welded to the aft contact portion 232. In other embodiments, adjacent compressor disks may be bolted together. Adjacent compressor disks may also couple together with an interference fit or a pilot fit.

In the embodiment illustrated, compressor cone 215 is adjacent forward compressor disk 221. In other embodiments, compressor cone 215 is integral to forward compressor disk 221 and extends forward, away from aft compressor disk 231. In the embodiment illustrated, compressor hub 260 is integral to aft compressor disk 231 and extends aft, away from forward compressor disk 221. In other embodiments, compressor hub 260 is aft of aft compressor disk 231. Compressor cone 215 and compressor hub 260 may couple to gas producer shaft 120 and may determine the axis of rotation of compressor rotor assembly 210.

Compressor rotor assembly 210 may also include spacers 240 between adjacent compressor disks. Spacers 240 may be a toroid or a hollow cylinder and may contact compressor disks adjacent to compressor rotor blades 235. Spacers 240 may define a portion of the radially inner flow path of the compressor 200.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys.

Figure 3:
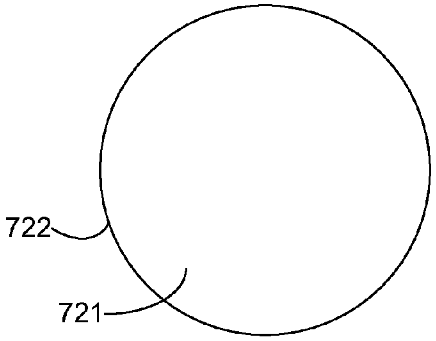
FIG. 3 is a simplified illustration of a plan view of two rotor disks in a rotor assembly, such as the compressor disks of FIG. 2, with ideal or theoretical concentricity.
Figure 4:
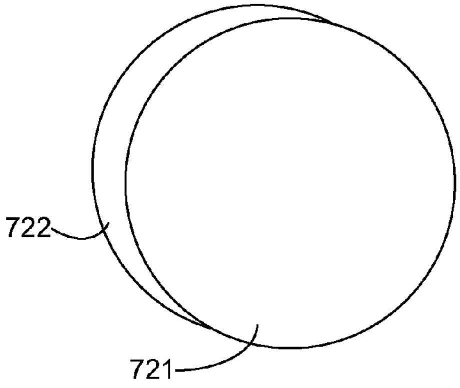
FIG. 4 is a simplified illustration of a plan view of non-ideal concentricity of two rotor disks in a rotor assembly, such as the compressor disks of FIG. 2.

Due to the tolerances of each rotor disk and the limitations in manufacturing, rotor disks may not assemble in an ideal state during assembly or stacking of a rotor assembly, such as compressor rotor assembly 210 or turbine rotor assembly 410. FIG. 3 is a simplified illustration of a plan view of two rotor disks 721 and 722 in a rotor assembly, such as the compressor disks of FIG. 2, with ideal or theoretical concentricity. FIG. 4 is a simplified illustration of a plan view of non-ideal concentricity of two rotor disks 721 and 722 in a rotor assembly, such as the compressor disks of FIG. 2. For example, rotor disks 721 and 722 of FIGS. 3 and 4 may be forward compressor disk 221, an intermediate compressor disk 222, or aft compressor disk 231. As illustrated in FIG. 3, only rotor disk 721 is visible as the centers of rotor disks 721 and 722 are perfectly aligned in an ideal state.

As illustrated in FIG. 4, the centers of rotor disks such as 721 and 722 may vary and be offset. While each rotor disk in a rotor assembly may not be concentric with any other rotor disk, the concentricity of each rotor disk may be the measured eccentricity between the center of the rotor disk and a selected datum or reference axis. The lack of concentricity or eccentricity may also be defined as centerline deviation.

Figure 5:
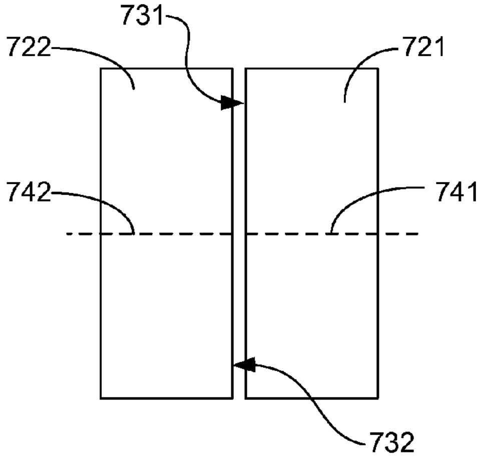
FIG. 5 is a simplified illustration of a side view of two rotor disks in a rotor assembly, such as the compressor disks of FIG. 2, with ideal or theoretical parallelism.
Figure 6:
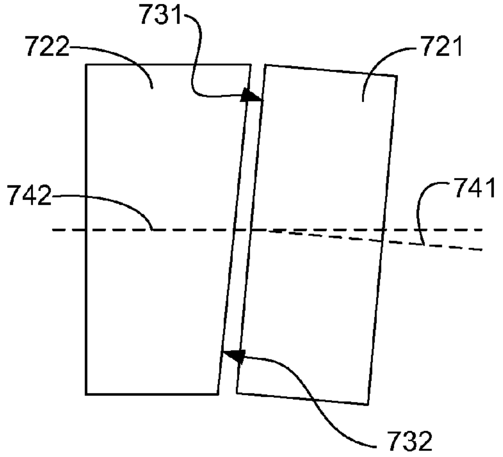
FIG. 6 is a simplified illustration of a side view of non-ideal parallelism of two rotor disks in a rotor assembly, such as the compressor disks of FIG. 2.

The geometric deviations of rotor disks in a rotor assembly may also include a lack in parallelism. FIG. 5 is a simplified illustration of a side view of two rotor disks 721 and 722 in a rotor assembly, such as the compressor disks of FIG. 2, with ideal or theoretical parallelism. FIG. 6 is a simplified illustration of a side view of non-ideal parallelism of two rotor disks 721 and 722 in a rotor assembly, such as the compressor disks of FIG. 2. For example, rotor disks 721 and 722 of FIGS. 5 and 6 may be forward compressor disk 221, an intermediate compressor disk 222, or aft compressor disk 231. As illustrated in FIG. 5, contact surfaces 731 and 732 are perfectly parallel to one another. The two rotor disks 721 and 722 in FIG. 5 and FIG. 6 are shown with a gap between them to more clearly illustrate the parallelism.

Similar to the concentricity, the tolerances of each rotor disk and the limitations in manufacturing, rotor disks may not assemble in an ideal state during assembly or stacking of a rotor assembly. As illustrated in FIG. 6, contact surfaces 731 may not be perfectly parallel to one another. The lack of parallelism may affect the eccentricity of subsequent rotor disks, similar to the eccentricity of rotor disk 721 illustrated in FIG. 6, where the eccentricity increases while moving along axis 741 due to the angle between axis 741 and axis 742. The lack of parallelism may be measured between adjacent contact surfaces of a rotor assembly or may be measured between each contact surface and a datum or reference plane. The lack of parallelism may also be referred to as parallelism deviation, the total runout on the top face of a rotor disk.

Figure 7:
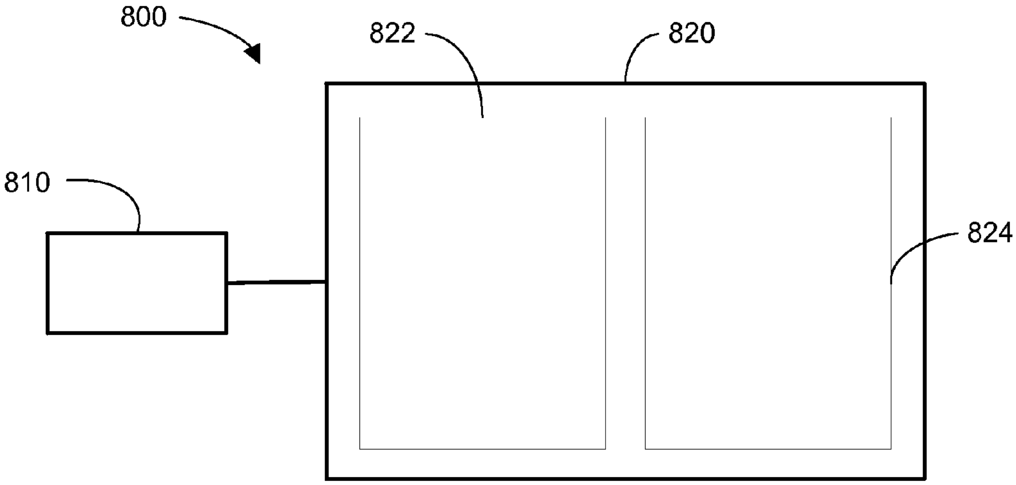
FIG. 7 is a functional block diagram of a stacking system for a gas turbine engine rotor such as the compressor rotor assembly of FIG. 2.

FIG. 7 is a block diagram of a stacking system 800 for a gas turbine engine 100 rotor such as the compressor rotor assembly 210 of FIG. 2. Stacking system 800 includes a measurement device 810 and a stacking module 820. The stacking module 820 includes a recordation module 822 and an optimization module 824. The measurement device 810 may include a gauge or tool capable of measuring or determining the concentricity and parallelism of a rotating part such as a rotor disk. The measurement device 810 may include, inter alia, sensors and a turning table. The measurement device 810 may be configured to measure flat surfaces, the surfaces of coupling teeth, or other surfaces of contact surfaces between rotor disks. The measurement device 810 may send or transmit the measurements taken to the stacking module 820.

The recordation module 822 may receive and store the measurements taken by the measurement device 810 or the predetermined values relating to the concentricity and parallelism of each rotating part and stores them in a spreadsheet or database. In some embodiments, the recordation module 822 may determine or predetermine the values relating to the concentricity and parallelism of each rotating part prior to storing the concentricity and parallelism of each rotating part. The predetermined data may include the parallelism amount and the parallelism angle, the angular location of the high point of the parallelism on the rotating part relative to a predetermined angular reference point on the rotor disk. The data recorded may also include the concentricity amount and the concentricity angle, the angular location of the concentricity on the rotating part relative to the predetermined angular reference point on the rotor disk. The recordation module 822 may store or record the predetermined values in a database or within a spreadsheet. In some embodiments, some data may not be measured directly and may be calculated or predetermined by the recordation module 822 prior to storing or recording the data; such data may include the parallelism amount and the concentricity amount.

The optimization module 824 uses the stored data in the recordation module 822 to determine an optimal angle for each rotor disk to be installed relative to a predetermined reference point in the embodiment illustrated. In other embodiments, the optimization module 824 may acquire the data related to the concentricity and parallelism of each disk from an alternate location.

Optimization module 824 may optimize the angle for each rotor disk based on the parallelism deviation for all rotor disks simultaneously, based on the concentricity deviation for all rotor disks simultaneously, or based on the combined parallelism and concentricity deviations for all rotor disks simultaneously. The optimization module 824 may minimize the total parallelism deviation, the total concentricity deviation, or the combined total parallelism and total concentricity deviations.

The optimization module 824 may consider both the first journal or contact with the shaft and the second journal or contact with the shaft. In some embodiments, the first journal includes compressor hub 260 and the second journal includes compressor cone 215. In one embodiment, the first journal also includes aft compressor disk 231. In another embodiment, the second journal also includes forward compressor disk 221. The center of the first journal and the center of the second journal may be used to establish a datum or reference for the parallelism and concentricity deviations for the rotor disks. Minimizing the total parallelism deviation, the total concentricity deviation, and the combined total parallelism and total concentricity deviations may include the parallelism and concentricity deviations of each rotor disk relative to the datum established between the first journal and the second journal.

In some embodiments, the stacking module 820 includes a computer that determines a build angle for each rotating part as disclosed herein. The stacking module 820 may include an electronic control circuit having a central processing unit (CPU), such as a processor, or micro controller. Alternatively, the stacking module 820 may include programmable logic controllers or field-programmable gate arrays. The stacking module 820 may also include memory for storing computer executable instructions, which may be executed by the CPU. The memory may further store data related to measuring the concentricity and parallelism of each rotor disk, and calculating the angular position of each rotor disk. The stacking module 820 may also include inputs and outputs to receive sensor signals and send control signals.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 1, a gas (typically air 10) enters the inlet 110 as a "working fluid" and passes through inlet guide vanes 255. Inlet guide vanes 255 may control the amount of the working fluid that enters compressor 200. The working fluid is then compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500). Likewise, each turbine disk assembly 415 may be associated with a numbered stage.

Once compressed air 10 leaves the compressor 200, it enters the combustor 300, where it is diffused and fuel is added. Air 10 and fuel are injected into the combustion chamber 390 via fuel injector 310 and combusted. Energy is extracted from the combustion reaction via the turbine 400 by each stage of the series of turbine disk assemblies 415. Exhaust gas 90 may then be diffused in exhaust diffuser 520, collected and redirected. Exhaust gas 90 exits the system via an exhaust collector 550 and may be further processed (e.g., to reduce harmful emissions, and/or to recover heat from the exhaust gas 90).

The tolerances of the components and assemblies of gas turbine engine 100 are tightly controlled. For rotor assemblies, such as compressor rotor assembly 210 and turbine rotor assembly 410, the alignment of the rotating parts of the rotor assembly including the first journal, the second journal, and the rotor disks there between must be within a predetermined tolerance, often within one or two thousandths of an inch. After assembling or stacking a rotor assembly, a predetermined tolerance of the rotor assembly may be verified; the rotor assembly may be measured to verify that the overall rotor assembly is within the predetermined tolerance. When the overall rotor assembly is not within the predetermined tolerance, the assembly must be disassembled or unstacked and the process must be repeated, resulting in increased manufacturing or overall costs.

Poor alignment of the rotor assembly may lead to an imbalance and vibration. Poor alignment may also result in rotating parts rubbing and contacting non-rotating parts. The vibration and contact between components may result in, inter alia, damage, wear, and reduced efficiency.

Figure 8:
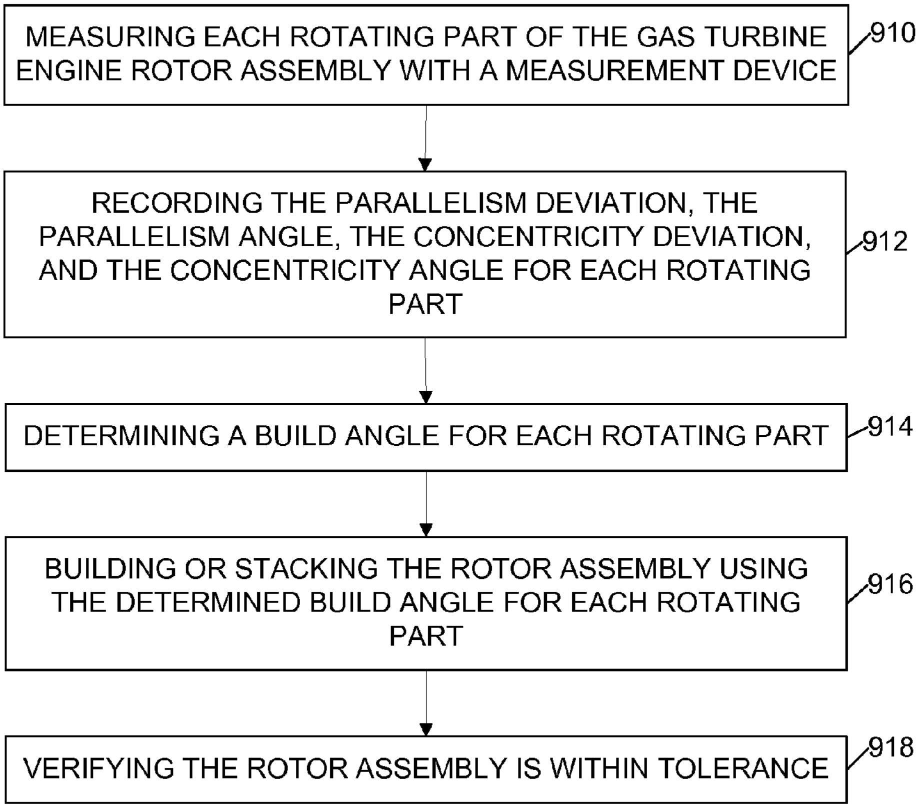
FIG. 8 is a flowchart of a method for stacking a gas turbine engine rotor such as the compressor rotor assembly of FIG. 2.

FIG. 8 is a flowchart of a method for stacking a gas turbine engine rotor assembly, such as the compressor rotor assembly 210 of FIG. 2. The method includes measuring each rotating part of a gas turbine engine rotor assembly with the measurement device 810 at step 910. The measurement device 810 may be a measurement gage or system. Measuring each rotating part of the gas turbine engine rotor assembly may include obtaining precision measurements of concentricity and parallelism for each rotating part relative to the opposite side of the part in the stacked orientation. Step 910 is followed by recording the parallelism deviation, the parallelism angle, the concentricity deviation, and the concentricity angle for each rotating part in the recordation module 822 at step 912.

In some embodiments, the measurement device 810 may provide the precision measurements of concentricity and parallelism for each rotating part to the recordation module 822. In other embodiments, the recordation module 822 may include calculating the parallelism deviation and the concentricity deviation for each rotating part at step 912. In one embodiment, the first journal, the rotor disks, and the second journal are each measured with the measurement device 810 to determine and record the first journal parallelism amount and angle, each rotor disk parallelism amount and angle, the second journal parallelism amount and angle, the first journal concentricity amount and angle, each rotor disk concentricity amount and angle, and the second journal concentricity amount and angle.

The parallelism angle may be the angle about the axis of the rotating part between a predetermined reference point on a rotating part and the location of the high point of the parallelism deviation. The concentricity angle may be the angle about the axis of the rotating part between the predetermined reference point on the rotating part and the location of the concentricity deviation.

Figure 9:
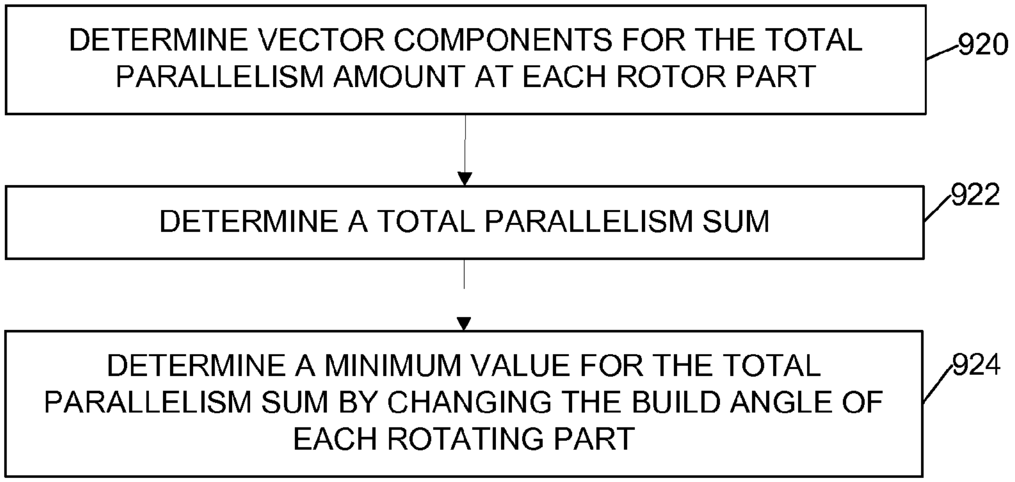
FIG. 9 is a flowchart of a method for determining the build angle for each rotating part of a gas turbine engine rotor assembly, such as the compressor rotor assembly of FIG. 2, by optimizing the parallelism of the rotor assembly as a whole.
Figure 10:
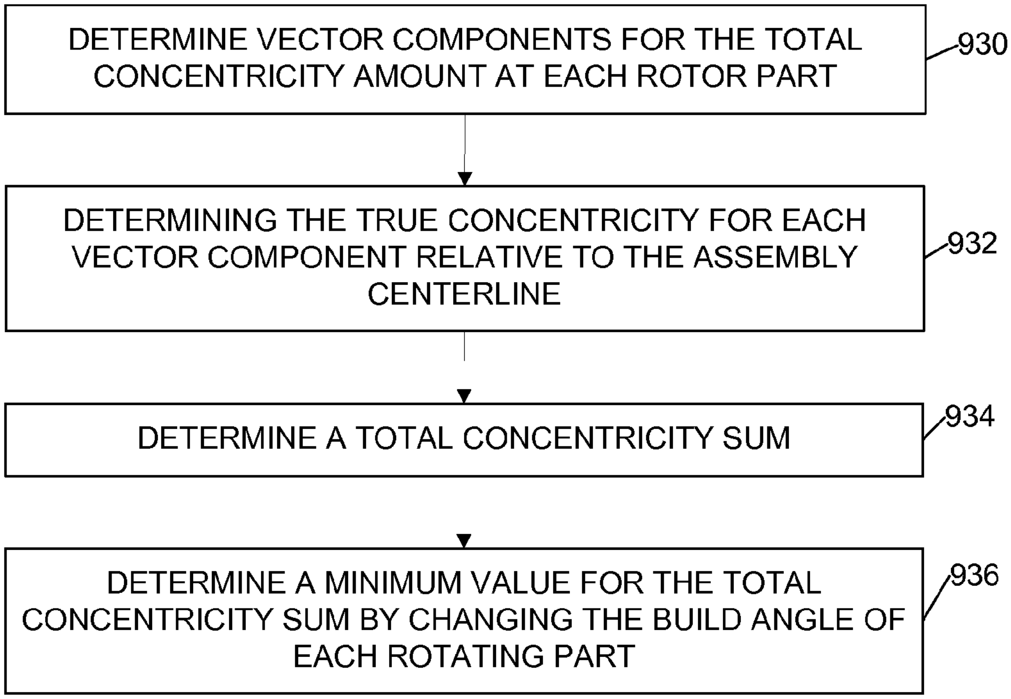
FIG. 10 is a flowchart of a method for determining the build angle for each rotating part of a gas turbine engine rotor assembly, such as the compressor rotor assembly of FIG. 2, by optimizing the concentricity of the rotor assembly as a whole.
Figure 11:
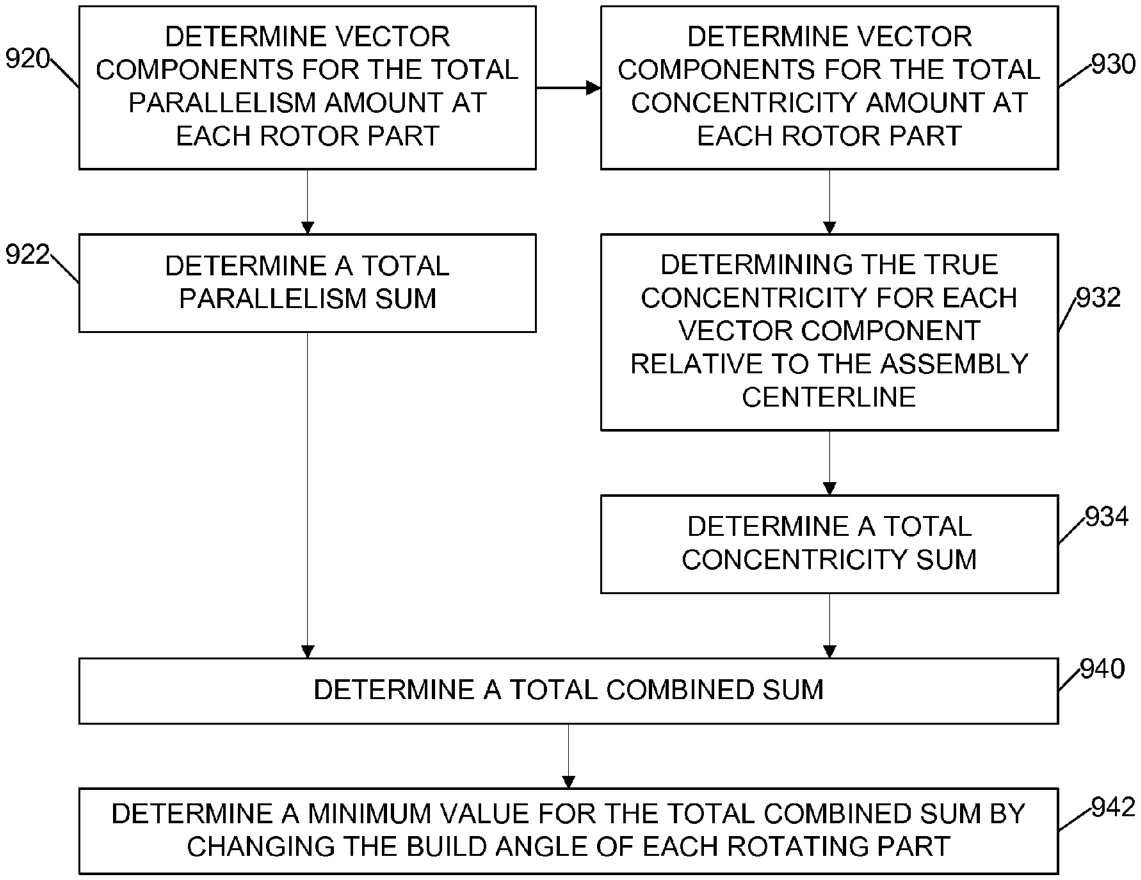
FIG. 11 is a flowchart of a method for determining the build angle for each rotating part of a gas turbine engine rotor assembly, such as the compressor rotor assembly of FIG. 2, by optimizing the parallelism and the concentricity of the rotor assembly as a whole.

Step 912 is followed by determining a build angle for each rotating part with the optimization module 824 at step 914. Step 914 may include optimizing for the parallelism of the rotor assembly as a whole as illustrated in FIG. 9, optimizing for the concentricity of the rotor assembly as a whole as illustrated in FIG. 10, or optimizing for the combined parallelism and concentricity of the rotor assembly as a whole as illustrated in FIG. 11. The build angle may be the angle between the predetermined reference point on a rotating part and the predetermined reference point on the first journal.

The build angle for each rotating part may be limited to angles corresponding to available coupling positions of each rotating part or rotor disk determined by coupling features such as coupling teeth or bolt holes. For example, a rotor disk with sixty coupling teeth may be coupled every six degrees, the angle between two adjacent teeth. Coupling positions may also be limited by other features, such as rotor blade positions. In some embodiments, the build angle may be determined and then rounded to the nearest coupling position.

Step 914 is followed by building or stacking the rotor assembly using the determined build angle for each rotating part at step 916. Step 916 is followed by verifying the rotor assembly is within tolerance at step 918. If the rotor is not within tolerance, the method may be repeated starting from step 910, 914, or 916.

FIG. 9 is a flowchart of a method for determining the build angle for each rotating part of a gas turbine engine rotor assembly, such as the compressor rotor assembly 210 of FIG. 2, by optimizing the parallelism of the rotor assembly as a whole with the optimization module 824. The method as described in accordance with FIG. 9 may be utilized as step 912 of the method described above in accordance with FIG. 8. The method includes determining vector components for the total parallelism amount at each rotating part at step 920. The vector components may be the 'I' component and the 'J' component of each vector. The total parallelism amount for any given rotating part or numbered stage may be the parallelism of the rotor stack up to that rotating part, including all previously stacked rotating parts. Determining the vector components may be determining the Cartesian coordinates 'I' and 'J' for the total parallelism vector relative to the angular location of the parallelism high point. The total parallelism vector may be the vector magnitude, the total parallelism amount or parallelism magnitude, relative to the vector angle, the total parallelism angle, for the rotor stack up to and including the current rotating part. The rotor stack being the rotating parts assembled up to the current rotating part being assembled.

The total parallelism amount 'I' component may be determined by determining the 'I' component of the parallelism at a build angle and adding it to the 'I' component of the total parallelism amount for the previous rotating part. The total parallelism amount 'I' component for a rotating part may be expressed as:

$$TBA_i = BP^*\sin\theta + TBA_{prev};\theta = BP_{angle} - (360 - \mathrm{BA})$$

where $TBA_i$ is the total parallelism amount 'I' component, BP is the predetermined parallelism amount for the rotating part, $TBA_{prev}$ is the total parallelism amount 'I' component for the rotating part to be stacked prior to the rotating part, $BP_{angle}$ is the predetermined parallelism angle for the rotating part, and BA is the build angle for the rotating part. For example, the second rotating part of a stack, the rotating part to be stacked on top of and coupled to the first journal, would have a total parallelism amount 'I' component equal to the 'I' component of the second rotating part at its build angle plus the total 'I' component of the first journal; the third rotating part of the stack, the rotating part to be stacked on top of and coupled to the second rotating part, would have a total parallelism amount 'I' component equal to the 'I' component of the third rotor component at its build angle plus the total 'I' component of the second rotating part; the first journal total parallelism amount 'I' component is the parallelism amount 'I' component of the predetermined or measured first journal parallelism amount.

Similarly, the total parallelism amount 'J' component may be determined by determining the 'J' component of the parallelism at a build angle and adding it to the 'J' component of the total parallelism amount for the previous rotating part. The total parallelism amount 'J' component for a rotating part may be expressed as:

$$TBA_j = BP^*\cos\theta + TBA_{prev};\theta = BP_{angle} - (360 - \mathrm{BA})$$

where $TBA_j$ is the total parallelism amount 'I' component, BP is the predetermined parallelism amount for the rotating part, $TBA_{prev}$ is the total parallelism amount 'J' component for the rotating part to be stacked prior to the rotating part, $BP_{angle}$ is the predetermined parallelism angle for the rotating part, and BA is the build angle for the rotating part.

Step 920 is followed by determining a total parallelism sum at step 922. The total parallelism sum is determined by determining the magnitude of each total parallelism vector and adding the magnitudes into a single sum. Each magnitude may be a polar magnitude determined by taking the square root of the sum of the 'I' component squared and the 'J' component squared. Each magnitude may be expressed as:

$$M_{bp} = \sqrt{i^2 + j^2}$$

where $M_{bp}$ is the magnitude of a total parallelism vector, i is the 'I' component of the total parallelism vector, and j is the 'J' component of the total parallelism vector.

The method also includes determining or optimizing a minimum value for the total parallelism sum by changing the build angle of each rotating part at step 924. A solver/tool may be used to determine or optimize the minimum value for the total parallelism sum. The solver/tool may include inputs and/or one or more goals/desired outcomes. The solver functions according to its implementation, which may be any available implementation or a customized implementation to produce a designed output based on the inputs. In some processes/procedures, a designer may refine/change a design (e.g., one produced by the solver) by, for example, providing different/modified inputs or changing inputs to the solver. Refining or changing a design may be performed one or more times and/or at any time.

The changing inputs may include the build angle for each rotating part. The solver/tool may also include fixed inputs such as the parallelism amount and the parallelism angle for each rotating part. The solver/tool may repeat steps 920 and 922 to determine or optimize the minimum value for the parallelism sum, modifying the build angle for one or more rotating parts with each run or pass of steps 920 and 922.

Constraints for the build angles may be implemented within the solver/tool. In one embodiment, the values for the build angles are limited to values from 0 to 360. In another embodiment, the values for the build angles may be limited to the values of the angles corresponding to the possible coupling positions of the rotating part, such as the locations of the coupling teeth or bolt holes.

FIG. 10 is a flowchart of a method for determining the build angle for each rotating part of a gas turbine engine rotor assembly, such as the compressor rotor assembly 210 of FIG. 2, by optimizing the concentricity of the rotor assembly as a whole with the optimization module 824. The method as described in accordance with FIG. 10 may be utilized as step 912 of the method described above in accordance with FIG. 8. The method includes determining vector components for the total concentricity amount for each rotating part at step 930. The vector components may be the 'I' component and the 'J' component of each vector. The total concentricity amount for any given rotating part or numbered stage may be the concentricity of the rotor stack up to that rotating part, including all previously stacked rotating parts. Determining the vector components may be determining the Cartesian coordinates 'I' and 'J' for the total concentricity vector. The total concentricity vector may be the vector magnitude, the total concentricity amount or concentricity magnitude, relative to the vector angle, the total concentricity angle for the rotor stack up to and including the current rotating part.

The total concentricity amount 'I' component may be determined by determining the 'I' component of the concentricity at a build angle, adding it to the 'I' component of the total concentricity amount for the previous rotating part, and subtracting the 'I' component of the concentricity error caused by the total parallelism error of the previous rotating part. The total concentricity amount 'I' component for a rotating part may be expressed as:

$$TCA_i = C*\sin\theta + CA_{prev} - H_{rp}*\frac{TBA_{prev}}{\phi_{rp}};$$

$$\theta = C_{angle} - (360 - BA)$$

where $TCA_i$ is the total concentricity amount 'I' component, C is the predetermined concentricity amount for the rotating part, $CA_{prev}$ is the total concentricity amount 'I' component for the rotating part to be stacked prior to the rotating part, $H_{rp}$ is the height of the rotating part, $TBA_{prev}$ is the total parallelism amount 'I' component for the rotating part to be stacked prior to the rotating part, $ø_{rp}$ is the diameter of the rotating part, $C_{angle}$ is the predetermined concentricity angle for the rotating part, and BA is the build angle for the rotating part. For example, the second rotating part of a stack, the rotating part to be stacked on top of and coupled to the first journal, would have a total concentricity amount 'I' component equal to the 'I' component of the second rotating part at its build angle plus the total 'I' component of the first journal, minus the 'I' component of the concentricity error due to the parallelism error of the first journal; the third rotating part of the stack, the rotating part to be stacked on top of and coupled to the second rotating part, would have a total concentricity amount 'I' component equal to the 'I' component of the third rotor component at its build angle plus the total 'I' component of the second rotating part, minus the 'I' component of the concentricity error due to the total parallelism error of the previous rotating part or the parallelism error of the stack up to the previous rotating part; the first journal total concentricity amount 'I' component is the concentricity amount 'I' component of the predetermined first journal parallelism amount.

Similarly, the total concentricity amount 'J' component may be determined by determining the 'J' component of the concentricity at a build angle, adding it to the 'J' component of the total concentricity amount for the previous rotating part, and subtracting the 'J' component of the concentricity error caused by the total parallelism error of the previous rotating part. The total concentricity amount 'I' component for a rotating part may be expressed as:

$$TCA_j = C*\sin\theta + CA_{prev} - H_{rp} * \frac{TBA_{prev}}{\phi_{rp}};$$

$$\theta = C_{angle} - (360 - BA)$$

where $TCA_j$ is the total concentricity amount 'J' component, C is the predetermined concentricity amount for the rotating part, $CA_{prev}$ is the total concentricity amount 'J' component for the rotating part to be stacked prior to the rotating part, $H_{rp}$ is the height of the rotating part, $TBA_{prev}$ is the total parallelism amount 'J' component for the rotating part to be stacked prior to the rotating part, $ø_{rp}$ is the diameter of the rotating part, $C_{angle}$ is the predetermined concentricity angle for the rotating part, and BA is the build angle for the rotating part. Step 930 may include step 920 to determine the concentricity error due to the total parallelism error of the previous rotating part.

Step 930 is followed by determining the true concentricity for each vector component relative to the assembly centerline, the concentricity values relative to the datum between the center of the first journal and the center of the second journal at step 932. The true concentricity is therefore the concentricity of the rotor stack up to the rotating part being stacked with respect to the rotor assembly center of rotation jointly established by the first journal and the second journal.

The true concentricity 'I' component for a rotating part may be determined by adding the total concentricity 'I' component for the current rotating part to the product of the total concentricity 'I' component for the second journal or final rotating part multiplied by the current run length ratio, the current run length divided by the overall run length. The true concentricity 'I' component may be expressed as:

$$TC_i = C_{1_i} * \frac{L_c}{L_t} + TCA_i$$

where $TC_i$ is the true concentricity 'I' component for the rotating part, $C_{1_i}$ is the total concentricity 'I' component of the first rotating part, $L_c$ is the current run length, $L_t$ is the overall run length, and $TCA_i$ is the total concentricity amount 'I' component for the rotating part.

Similarly, the true 'J' component for a rotating part may be determined by adding the total concentricity 'J' component for the current rotating part to the product of the total concentricity 'J' component for the second journal or final rotating part multiplied by the current run length ratio, the current run length divided by the overall run length. The true concentricity 'J' component may be expressed as:

$$TC_j = C_{1_j} * \frac{L_c}{L_t} + TCA_j$$

where $TC_j$ is the true concentricity 'J' component for the rotating part, $C_{1_j}$ is the total concentricity 'J' component of the first rotating part, $L_c$ is the current run length, $L_t$ is the overall run length, and $TCA_j$ is the total concentricity amount 'J' component for the rotating part.

The current run length is the stack length up to the current rotating part as the rotor assembly will be constructed and the overall run length is the entire length of the rotor assembly or the overall stack length.

Step 932 is followed by determining a total concentricity sum at step 934. The total concentricity sum is determined by determining the magnitude of each true concentricity vector and adding the magnitudes into a single sum. Each magnitude may be a polar magnitude determined by taking the square root of the sum of the true 'I' component squared and the true 'J' component squared. Each magnitude may be expressed as:

$$M_c = \sqrt{i^2 + j^2}$$

where $M_c$ is the magnitude of a true concentricity vector, i is the 'I' component of the true concentricity vector, and j is the 'J' component of the true concentricity vector.

The method also includes determining or optimizing a minimum value for the total concentricity sum by changing the build angle of each rotating part at step 936. A solver/tool may be used to determine or optimize the minimum value for the total concentricity sum. The solver/tool may include inputs and/or one or more goals/desired outcomes. The solver functions according to its implementation, which may be any available implementation or a customized implementation to produce a designed output based on the inputs. In some processes/procedures, a designer may refine/change a design (e.g., one produced by the solver) by, for example, providing different/modified inputs or changing inputs to the solver. Refining or changing a design may be performed one or more times and/or at any time.

The changing inputs may include the build angle for each rotating part. The solver/tool may also include fixed inputs such as the concentricity amount and the concentricity angle for each rotating part. The solver/tool may repeat steps 930, 932, and 934 to determine or optimize the minimum value for the parallelism sum, modifying the build angle for one or more rotating parts with each run or pass of steps 930, 932, and 934.

Constraints for the build angles may be implemented within the solver/tool. In one embodiment, the values for the build angles are limited to values from 0 to 360. In another embodiment, the values for the build angles may be limited to the values of the angles corresponding to the possible coupling positions of the rotating part, such as the locations of the coupling teeth or bolt holes.

FIG. 11 is a flowchart of a method for determining the build angle for each rotating part of a gas turbine engine rotor assembly, such as the compressor rotor assembly 210 of FIG. 2, by optimizing the parallelism and the concentricity of the rotor assembly as a whole with the optimization module 824. The method as described in accordance with FIG. 11 may be utilized as step 912 of the method described above in accordance with FIG. 8. The method includes determining vector components for the total parallelism amount at each rotating part at step 920. Step 920 is followed by determining a total parallelism sum at step 922. Steps 920 and 922 of the method of FIG. 11 are the same or similar to those steps as described in the method of FIG. 9.

The method also includes determining vector components for the total concentricity amount for each rotating part at step 930. Step 930 may use the results of step 920 to determine the concentricity error due to the total parallelism error of the previous rotating part. Step 930 is followed by determining the true concentricity for each vector component relative to the assembly centerline, the concentricity values relative to the datum between the center of the first journal and the center of the second journal at step 932. Step 932 is followed by determining a total concentricity sum at step 934. Steps 930, 932, and 934 of the method of FIG. 11 are the same or similar to those steps as described in the method of FIG. 10.

The method further includes determining a total combined sum at step 940. The total combined sum may be the sum of the total parallelism sum and the total concentricity sum. In some embodiments, the total parallelism sum or the total concentricity sum may be weighted. The total parallelism sum, the total concentricity sum or both may be increased or decreased by a percentage to weigh the results in favor of parallelism optimization or concentricity optimization.

Step 940 is followed by determining a minimum value for the total combined sum by changing the build angle of each rotating part at step 942. A solver/tool may be used to determine or optimize the minimum value for the total combined sum. The solver/tool may include inputs and/or one or more goals/desired outcomes. The solver functions according to its implementation, which may be any available implementation or a customized implementation to produce a designed output based on the inputs. In some processes/procedures, a designer may refine/change a design (e.g., one produced by the solver) by, for example, providing different/modified inputs or changing inputs to the solver. Refining or changing a design may be performed one or more times and/or at any time.

The changing inputs may include the build angle for each rotating part. The solver/tool may also include fixed inputs such as the parallelism amount, the parallelism angle, the concentricity amount, and the concentricity angle for each rotating part. The solver/tool may repeat steps 920, 922, 930, 932, and 934 to determine or optimize the minimum value for the parallelism sum, modifying the build angle for one or more rotating parts with each run or pass of steps 920, 922, 930, 932, and 934.

Constraints for the build angles may be implemented within the solver/tool. In one embodiment, the values for the build angles are limited to values from 0 to 360. In another embodiment, the values for the build angles may be limited to the values of the angles corresponding to the possible coupling positions of the rotating part, such as the locations of the coupling teeth or bolt holes.

In the methods described above, an intermediate step or value may be minimized or optimized prior to minimizing or optimizing the sums of the methods of FIG. 9, FIG. 10, or FIG. 11. In one embodiment, a parallelism vector polar amount or a concentricity vector polar amount may be minimized prior to minimizing the total sums at step 924 of FIG. 9, step 936 of FIG. 10, or step 942 of FIG. 11. In another embodiment, a simple sum of the parallelism vector polar amount and the concentricity vector polar amount for a given rotating part may be minimized prior to minimizing the total combined sum. For example, minimizing the parallelism vector polar amount and the concentricity vector polar amount for the rotating part adjacent the first journal may improve the taper straightness for the first journal.

As described in this specification, various apparatuses and methods are described as working to optimize particular parameters, functions, or operations. This use of the term optimize does not necessarily mean optimize in a theoretical or global sense. Rather, the apparatuses and methods may work to improve performance using algorithms that are expected to improve performance in at least many common cases. Similar terms like minimize or maximize are used in a like manner.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described a transmitting data to (or receiving from) a second device when there are intermediary devices that couple the first and second device and also when the first device is unaware of the ultimate destination of the data.

The preceding detailed description is merely exemplary in nature and is not intended to limit the invention or the application and uses of the invention. The described embodiments are not limited to use in conjunction with a particular type of gas turbine engine. It will be appreciated that the gas turbine engine in accordance with this disclosure can be implemented in various other configurations. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A method for optimizing a rotor assembly for a gas turbine engine, the rotor assembly including rotating parts including a first journal and one or more rotor disks being stacked sequentially onto the first journal, the method comprising:

measuring at least one of concentricity and parallelism of each rotating part;

automatically determining, by one or more processors, based on the measuring, vector components for a total parallelism vector for each rotating part, the total parallelism vector includes a parallelism magnitude and angle for a rotor stack of rotating parts up to and including the rotating part;

automatically determining, by the one or more processors, a total parallelism sum including determining the parallelism magnitude of each total parallelism vector, and adding the parallelism magnitudes into a single sum; and determining a minimum value for the total parallelism sum including selecting the rotating disk build angles and the second journal build angle that result in the smallest value for the total parallelism sum.

2. The method of claim 1, wherein the rotating parts include a second journal being stacked onto a final rotor disk of the one or more rotor disks; and wherein determining vector components for the total parallelism vector for each rotating part includes determining a total parallelism ‘I’ component for the first journal, the total parallelism ‘I’ component for the first journal being a parallelism amount ‘I’ component of a predetermined first journal parallelism amount at a predetermined first journal parallelism angle, determining a total parallelism ‘I’ component for each rotor disk including determining an ‘I’ component for the rotor disk at a selected rotor disk build angle of a predetermined rotor disk parallelism amount relative to a predetermined rotor disk parallelism angle, and adding the total parallelism ‘I’ component from the rotating part stacked prior and adjacent to the rotor disk to the ‘I’ component for the rotor disk at the selected build angle, determining a total parallelism ‘I’ component for the second journal including determining an ‘I’ component for the second journal at a selected second journal build angle of a predetermined second journal parallelism amount relative to a predetermined second journal parallelism angle, and adding the total parallelism ‘I’ component from the final rotor disk, determining a total parallelism ‘J’ component for the first journal, the total parallelism ‘J’ component for the first journal being a parallelism amount ‘J’ component of the predetermined first journal parallelism amount at the predetermined first journal parallelism angle, determining a total parallelism ‘J’ component for each rotor disk including determining a ‘J’ component for the rotor disk at a selected rotor disk build angle of the predetermined rotor disk parallelism amount relative to a predetermined rotor disk parallelism angle, and adding the total parallelism ‘J’ component from the rotating part stacked prior and adjacent to the rotor disk to the ‘J’ component for the rotor disk at the selected build angle, determining a total parallelism ‘J’ component for the second journal including determining a ‘J’ component for the second journal at a selected second journal build angle of the predetermined second journal parallelism amount relative to a predetermined second journal parallelism angle, and adding the total parallelism ‘J’ component from the final rotor disk.

3. The method of claim 1, wherein determining the minimum value for the total parallelism sum includes using a solver to minimize the total parallelism sum, the rotor disk build angles and the second journal build angle being changing inputs to the solver.

4. The method of claim 1, wherein the parallelism magnitude of each total parallelism vector is a polar magnitude determined by taking the square root of the sum of the total parallelism ‘I’ component for the rotating part squared and the total parallelism ‘J’ component for the rotating part squared.

5. The method of claim 1, wherein the rotor assembly is stacked using the selected rotor disk build angles and the second journal build angle.

6. The method of claim 5, wherein a predetermined tolerance of the rotor assembly is verified.

7. The method of claim 1, wherein a stacking system includes an optimization module which determines vector components for the total parallelism vector for each rotating part, determines the total parallelism sum, and determines the minimum value for the total parallelism sum.

8. A method for optimizing a rotor assembly for a gas turbine engine, the rotor assembly including rotating parts including a first journal, one or more rotor disks being stacked sequentially onto the first journal, and a second journal being stacked onto a final rotor disk of the one or more rotor disks, the method comprising:

measuring at least one of concentricity and parallelism of each rotating part;

automatically determining, by one or more processors based on the measuring, vector components for a total concentricity vector for each rotating part, the total concentricity vector includes a concentricity magnitude and angle for a rotor stack of rotating parts up to and including the rotating part;

automatically determining, by the one or more processors, a true concentricity for each vector component relative to a center of rotation for the rotor assembly determined by positions of the first journal and the second;

automatically determining, by the one or more processors, a total concentricity sum including determining a magnitude of each true concentricity vector, and adding the magnitudes into a single sum; and determining a minimum value for the total concentricity sum including selecting the rotor disk build angles and the second journal build angle that result in the smallest value for the total concentricity sum.

9. The method of claim 8, wherein determining vector components for the total concentricity vector for each rotating part includes determining a total concentricity 'I' component for the first journal, the total concentricity 'I' component for the first journal being a concentricity amount 'I' component of a predetermined first journal concentricity amount at a predetermined first journal concentricity angle, determining a total concentricity 'I' component for each rotor disk including determining an 'I' component for the rotor disk at a selected rotor disk build angle of a predetermined rotor disk concentricity amount relative to a predetermined rotor disk concentricity angle, adding the total concentricity 'I' component from the rotating part stacked prior and adjacent to the rotor disk to the 'I' component for the rotor disk at the selected build angle, and subtracting an 'I' component of a concentricity error for the rotor disk caused by a total parallelism error of the rotating parts stacked prior to the rotor disk, determining a total concentricity 'I' component for the second journal including determining an 'I' component for the second journal at a selected second journal build angle of a predetermined second journal concentricity amount relative to a predetermined second journal concentricity angle, and adding the total concentricity 'I' component from the final rotor disk, and subtracting an 'I' component of a concentricity error for the second journal caused by a total parallelism error of the rotating parts stacked up to the final rotor disk, determining a total concentricity 'J' component for each rotor disk including determining a concentricity 'J' component for the rotor disk at a selected rotor disk build angle of a predetermined rotor disk concentricity amount relative to a predetermined rotor disk concentricity angle, adding the total concentricity 'J' component from the rotating part stacked prior and adjacent to the rotor disk to the concentricity 'J' component for the rotor disk at the selected build angle, and subtracting a 'J' component of a concentricity error for the rotor disk caused by a total parallelism error of the rotating parts stacked prior to the rotor disk, determining a total concentricity 'J' component for the second journal including determining a concentricity 'J' component for the second journal at a selected second journal build angle of a predetermined second journal concentricity amount relative to a predetermined second journal concentricity angle, and adding the total concentricity 'J' component from the final rotor disk, and subtracting a 'J' component of a concentricity error for the second journal caused by a total parallelism error of the rotating parts stacked up to the final rotor disk; and wherein determining the true concentricity for each vector component relative to the center of rotation for the rotor assembly determined by positions of the first journal and the second journal includes adding to each concentricity 'I' component for each rotor disk the product of the total concentricity 'I' component of the second journal multiplied by a ratio of a stack length up to the current rotating part divided by an overall stack length, and adding to each concentricity 'J' component for each rotor disk the product of the total concentricity 'J' component of the second journal multiplied by a ratio of a stack length up to the current rotating part divided by an overall stack.

10. The method of claim 8, wherein determining the minimum value for the total concentricity sum includes using a solver to minimize the total concentricity sum, the rotor disk build angles and the second journal build angle being changing inputs to the solver.

11. The method of claim 8, wherein the magnitude of each true concentricity vector is a polar magnitude determined by taking the square root of the sum of the true concentricity 'I' component for the rotating part squared and the true concentricity 'J' component for the rotating part squared.

12. The method of claim 8, wherein the rotor assembly is stacked using the selected rotor disk build angles and the second journal build angle.

13. The method of claim 8, wherein a stacking system includes an optimization module which determines vector components for the total concentricity vector for each rotating part, determines the total concentricity sum, and determines the minimum value for the total concentricity sum.

14. A method for optimizing a rotor assembly for a gas turbine engine, the rotor assembly including rotating parts including a first journal, one or more rotor disks being stacked sequentially onto the first journal, and a second journal being stacked onto a final rotor disk of the one or more rotor disks, the method comprising:

measuring, at least one of concentricity and parallelism of each rotating part;

automatically determining, by one or more processors based on the measuring, vector components for a total parallelism vector for each rotating part, the total parallelism vector includes a parallelism magnitude and angle for a rotor stack of rotating parts up to and including the rotating part;

automatically determining, by the one or more processors, a total parallelism sum including determining a parallelism magnitude of each total parallelism vector, and adding the parallelism magnitudes into a single sum;

automatically determining, by the one or more processors based on the measuring, vector components for a total concentricity vector, the total concentricity vector includes a concentricity magnitude and angle for a rotor stack of rotating parts up to and including the rotating part;

automatically determining, by the one or more processors, a true concentricity for each vector component relative to a center of rotation for the rotor assembly determined by positions of the first journal and the second journal;

automatically determining, by the one or more processors, a total concentricity sum including determining a concentricity magnitude of each true concentricity vector, and adding the concentricity magnitudes into a single sum;

automatically determining, by the one or more processors, a total combined sum including adding the total parallelism sum and the total concentricity sum into a single sum; and determining a minimum value for the total combined sum including selecting the rotor disk build angles and the second journal build angle that result in the smallest value for the total combined sum.

15. The method of claim 14, wherein determining vector components for the total parallelism vector for each rotating part includes determining a total parallelism 'I' component for the first journal, the total parallelism 'I' component for the first journal being a parallelism amount 'I' component of a predetermined first journal parallelism amount at a predetermined first journal parallelism angle, determining a total parallelism 'I' component for each rotor disk including determining a parallelism 'I' component for the rotor disk at a selected rotor disk build angle of a predetermined rotor disk parallelism amount relative to a predetermined rotor disk parallelism angle, and adding the total parallelism 'I' component from the rotating part stacked prior and adjacent to the rotor disk to the parallelism 'I' component for the rotor disk at the selected build angle, determining a total parallelism 'I' component for the second journal including determining a parallelism 'I' component for the second journal at a selected second journal build angle of a predetermined second journal parallelism amount relative to a predetermined second journal parallelism angle, and adding the total parallelism 'I' component from the final rotor disk, determining a total parallelism 'J' component for the first journal, the total parallelism 'J' component for the first journal being a parallelism amount 'J' component of the predetermined first journal parallelism amount at the predetermined first journal parallelism angle, determining a total parallelism 'J' component for each rotor disk including determining a parallelism 'J' component for the rotor disk at a selected rotor disk build angle of the predetermined rotor disk parallelism amount relative to the predetermined rotor disk parallelism angle, and adding the total parallelism 'J' component from the rotating part stacked prior and adjacent to the rotor disk to the parallelism 'J' component for the rotor disk at the selected build angle, determining a total parallelism 'J' component for the second journal including determining a parallelism 'J' component for the second journal at a selected second journal build angle of the predetermined second journal parallelism amount relative to the predetermined second journal parallelism angle, and adding the total parallelism 'J' component from the final rotor disk;

wherein determining vector components for the total concentricity vector for each rotating part includes determining a total concentricity 'I' component for the first journal, the total concentricity 'I' component for the first journal being a concentricity amount 'I' component of a predetermined first journal concentricity amount at a predetermined first journal concentricity angle, determining a total concentricity 'I' component for each rotor disk including determining an 'I' component for the rotor disk at a selected rotor disk build angle of a predetermined rotor disk concentricity amount relative to a predetermined rotor disk concentricity angle, adding the total concentricity 'I' component from the rotating part stacked prior and adjacent to the rotor disk to the 'I' component for the rotor disk at the selected build angle, and subtracting an 'I' component of a concentricity error for the rotor disk caused by a total parallelism error of the rotating parts stacked prior to the rotor disk, determining a total concentricity 'I' component for the second journal including determining an 'I' component for the second journal at a selected second journal build angle of a predetermined second journal concentricity amount relative to a predetermined second journal concentricity angle, and adding the total concentricity 'I' component from the final rotor disk, and subtracting an 'I' component of a concentricity error for the second journal caused by a total parallelism error of the rotating parts stacked up to the final rotor disk, determining a total concentricity 'J' component for each rotor disk including determining a concentricity 'J' component for the rotor disk at a selected rotor disk build angle of a predetermined rotor disk concentricity amount relative to a predetermined rotor disk concentricity angle, adding the total concentricity 'J' component from the rotating part stacked prior and adjacent to the rotor disk to the concentricity 'J' component for the rotor disk at the selected build angle, and subtracting a 'J' component of a concentricity error for the rotor disk caused by a total parallelism error of the rotating parts stacked prior to the rotor disk, determining a total concentricity 'J' component for the second journal including determining a concentricity 'J' component for the second journal at a selected second journal build angle of a predetermined second journal concentricity amount relative to a predetermined second journal concentricity angle, and adding the total concentricity 'J' component from the final rotor disk, and subtracting a 'J' component of a concentricity error for the second journal caused by a total parallelism error of the rotating parts stacked up to the final rotor disk; and wherein determining the true concentricity for each vector component relative to the center of rotation for the rotor assembly determined by positions of the first journal and the second journal includes adding to each concentricity 'I' component for each rotor disk the product of the total concentricity 'I' component of the second journal multiplied by a ratio of a stack length up to the current rotating part divided by an overall stack length, and adding to each concentricity 'J' component for each rotor disk the product of the total concentricity 'J' component of the second journal multiplied by a ratio of a stack length up to the current rotating part divided by an overall stack.

16. The method of claim 14, wherein determining a minimum value for the total combined sum includes using a solver to minimize the total combined sum, the rotor disk build angles and the second journal build angle being changing inputs to the solver.

17. The method of claim 14, wherein the parallelism magnitude of each total parallelism vector is a polar magnitude determined by taking the square root of the sum of the total parallelism 'I' component for the rotating part squared and the total parallelism 'J' component for the rotating part squared and the concentricity magnitude of each true concentricity vector is also a polar magnitude determined by taking the square root of the sum of the true concentricity 'I' component for the rotating part squared and the true concentricity 'J' component for the rotating part squared.

18. The method of claim 14, wherein the rotor assembly is stacked using the selected rotor disk build angles and the second journal build angle.

19. The method of claim 18, wherein a predetermined tolerance of the rotor assembly is verified.

20. The method of claim 14, wherein a stacking system including an optimization module determines the total parallelism sum, the total concentricity sum, the total combined sum, and the minimum value for the total combined sum.

* * * * *